March 4, 1969  W. P. TOSTI  3,431,051
PHOTOCOPIER
Filed June 22, 1967  Sheet 1 of 2
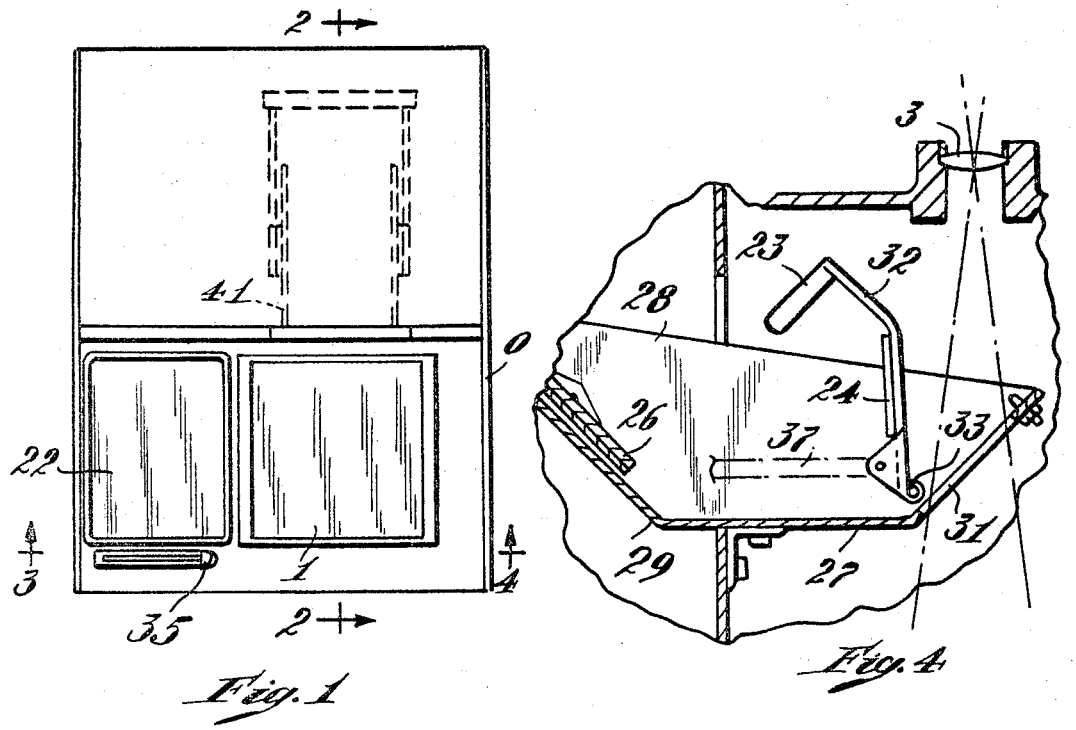
Fig. 1
Fig. 4
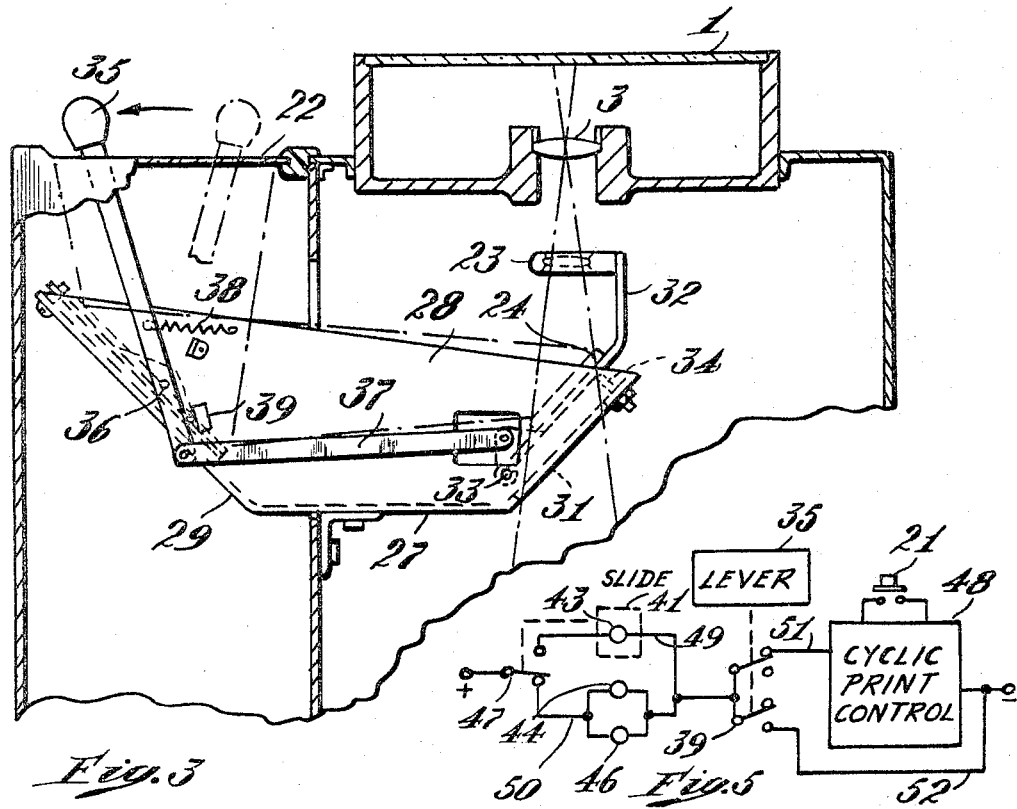
Fig. 3
Fig. 5

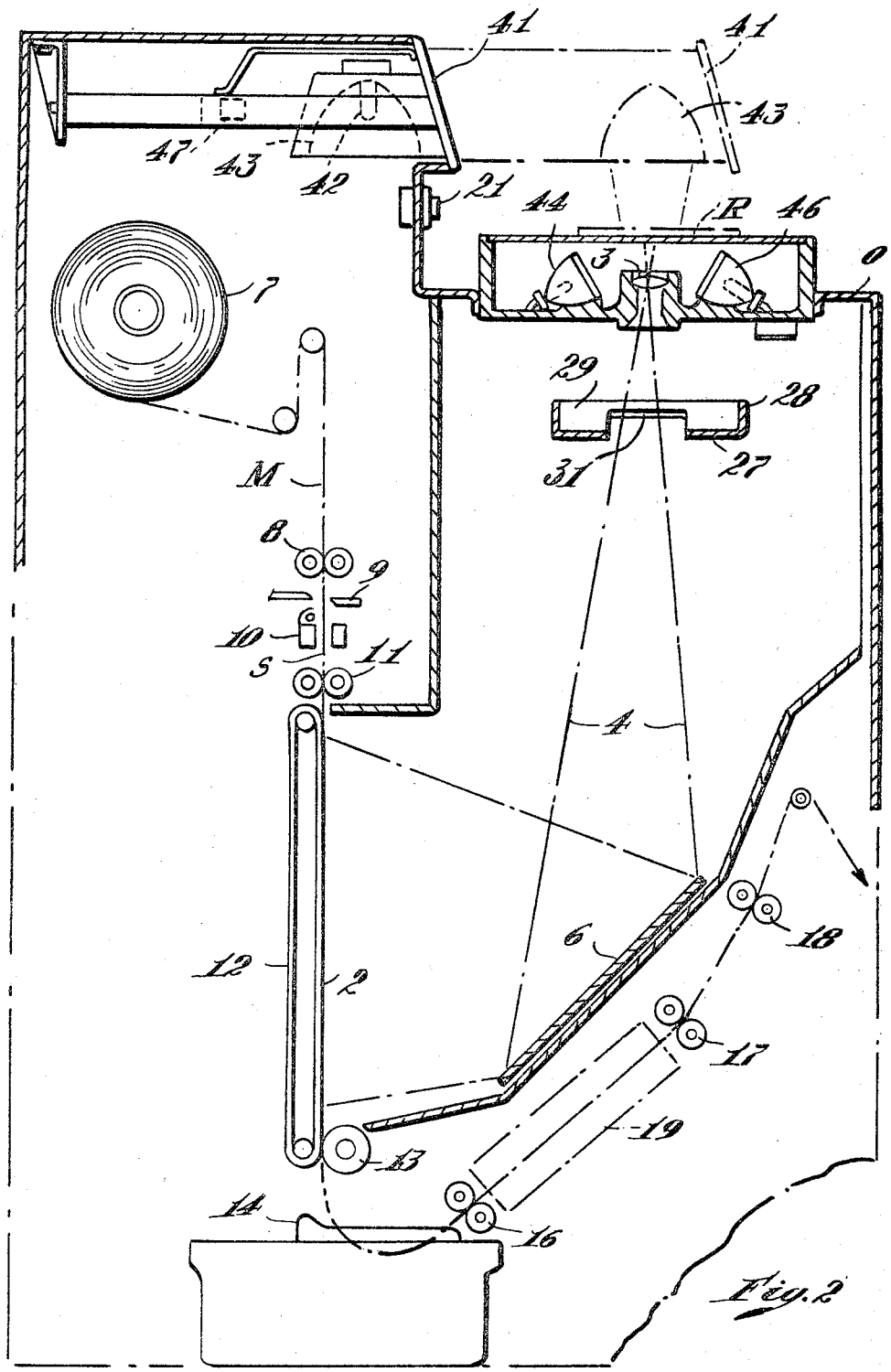

United States Patent Office 3,431,051
Patented Mar. 4, 1969

3,431,051
PHOTOCOPIER
William P. Tosti, Milford, Mass., assignor to Dennison Manufacturing Company, Framingham, Mass., a corporation of Nevada
Filed June 22, 1967, Ser. No. 648,149
U.S. Cl. 355—45    3 Claims
Int. Cl. G03b 13/28

ABSTRACT OF THE DISCLOSURE

A photographic apparatus for making enlarged prints of microfilm or small opaque records in which an image of a record in a record window is projected along a path by a first objective lens to a reading window. Also in the projection path is a second objective lens and a reflector mounted on a common sub-frame carrier which is pivotally mounted to permit image projection to the reading window in one position and image projection to light-sensitive material in another position as controlled by an actuator connected to the sub-frame carrier.

---

Objects of the invention are to provide apparatus of the type referred to which is simple and economical to produce, which affords quick and facile selection of a record from a microfilm or other group of records and positioning the record in accurate position to be printed, which prevents malfunctioning by inexperienced or careless operators and which is durable and reliable in use.

In one aspect the present invention involves apparatus comprising a housing having a record window and an exposure window, means for projecting an image of a record in the record window along a path leading to the exposure window, a reading window, an optical system for projecting an image of a record in the record window to the reading window, said system comprising a lens and a reflector, a carrier for holding the lens and reflector in fixed relation to each other, and an actuator for moving the carrier from an operative position in which the lens and reflector are in said path to an inoperative position in which they are out of said path. Preferably the apparatus is further characterized by yielding means for returning the actuator to inoperative position when released and a sub-frame fixedly mounted in said housing for supporting said lens, reflector and actuator, the sub-frame comprising a wall extending across said path with an opening in the path and the reflector covering the opening when the reflector is in operative position. In the preferred embodiment the apparatus has means for illuminating a record in the record window with two circuits for energizing the illuminating means for reading and exposing respectively, and means controlled by said actuator for closing the reading circuit and opening the exposing circuit when it is moved to operative position, and means in the exposing circuit for causing the apparatus to operate through a printing cycle.

For the purpose of illustration a typical embodiment of the invention is shown in the accompanying drawing in which FIG. 1 is a plan view;

FIG. 2 is a section on line 2—2 of FIG. 1;

FIG. 3 is a section on line 3–4 of FIG. 1 showing the aforesaid optical viewing system in operative position;

FIG. 4 is a similar section showing the optical viewing system in inoperative position ready for printing; and FIG. 5 is a circuit diagram.

The particular embodiment of the invention chosen for the purpose of illustration comprises an electrostatic copier like that disclosed and claimed in the copending application of Kenneth J. White, Ser. No. 587,197, filed Oct. 17, 1966. As disclosed in that application the copier comprises a housing 0 having a record window 1 to hold a record R and an exposure window 2 in which a strip of light-sensitive material M may be exposed, an image of the record being projected by a lens 3 to the exposure window along an optical path indicated at 4 which includes a mirror 6. The strip S is fed from a roll 7 by rollers 8 to a cutter 9 which cuts off sheets S, the sheets being fed to the exposure window by rollers 11 and belt 12 past a corona discharge device 10. After being exposed the sheets are fed from the window 2 by belt 12 and roller 13 to a developer or toner tray 14 and thence by rollers 16, 17 and 18 through a dryer 19 to a delivery station. In each cycle of operation one sheet is printed. Each cycle is initiated by momentarily closing a switch 21. The means for effecting a cycle of operations are fully disclosed in the aforesaid copending application and inasmuch as it forms no part of the present invention further repetition would be superfluous.

According to this invention the lens 3 is preferably adapted to magnify the records many times so as to produce enlarged prints of microfilm and other small records. To select the desired record and position it in the record window, an image of the record is projected to a viewer or reader window 22 by an auxiliary optical system comprising lens 23, mirror 24 and mirror 26 mounted on a sub-frame having a bottom 27, vertical side walls 28 and sloping end walls 29 one of which supports the mirror 24 and the other of which has an opening 31 in the optical path 4. The lens 23 and mirror 24 are mounted in fixed relationship to each other on an arm 32 pivoted to the sub-frame at 33 to swing from the inoperative position shown in FIG. 4 to the operative position shown in FIG. 3 where the mirror 24 covers the opening 31. An adjustable stop 34 positions the lens 23 and mirror 24 accurately in position to focus a record at the viewing window 22. The arm 32 is moved back and forth by a lever 35 pivoted to the sub-frame at 36 and connected to the arm by a link 37. A spring 38 returns the lever to inoperative position when the lever is released. The lever controls a switch 39.

In the upper part of the housing is a slide 41 movable from the inoperative position shown in full lines to the operative position shown in broken lines in FIG. 2. The slide carries a lamp 42 and a reflector 43 for projecting a beam of light through a transparency in the record window 1, and the slide controls a switch 47. Opaque records are printed with light from lamps 44 and 46.

While various circuit arrangements may be employed to control the various parts of the apparatus, a simple and effecting circuit is shown diagrammatically in FIG. 5 where 48 indicates the cyclic printing controls for feeding sheets to the exposure window, exposing the sheets and then feeding them through the developer tray and drier as in the aforesaid application. As shown in FIG. 5 the circuit comprises branch paths 49 and 50 from one side of the source of current to the lamps 43 and 44–46 respectively and branch paths 51 and 52 from the switch 39 to the other side of the source, branch 51 including well-known cycle control 48 for effecting a printing cycle and switch 21 for initiating a printing cycle, and branch 52 leading directly to the source.

The operation of the apparatus is as follows. A record R is placed in the record window 1 and the lever 35 is moved from the broken-line to the full-line position in FIG. 3. This shifts the lens 23 and mirror 24 into the operative position shown and shifts the switch 39 from upper to lower position (FIG. 5) thereby to illuminate the record through branch 52. If the record is opaque the slide 41 is left retracted, the switch 47 is in lower position (FIG. 5) and the lamps 44 and 46 are activated.

If the record is a transparency the slide 41 is pulled out to the broken-line position in FIG. 2 and the switch 47 is thereby shifted to upper position to activate lamp 43 instead of lamps 44 and 46. With the illumination turned on the desired record is selected and accurately placed in printing position. Then the lever 35 is released and the spring 38 snaps the optical viewing system to the inoperative position shown in FIG. 4. To make a print the switch 21 is closed momentarily to initiate a printing cycle in the manner of modern copiers such as diclosed for example in the aforesaid application.

It should be understood that the present disclosure is for the purpose of illustration only and that this invention includes all modifications and equivalents which fall within the scope of the appended claims.

I claim:

1. A photocopier comprising a housing having a record window and an exposure window, means for projecting an image of a record in the record window along a path leading to the exposure window, a reading window, an optical system for projecting an image of a record in the record window to the reading window, said system comprising a lens and a reflector, a carrier for holding the lens and reflector in fixed relation to each other, and an actuator for moving the carrier from an operative position in which the lens and reflector are in said path to an inoperative position in which they are out of said path.

2. A photocopier according to claim 1 further characterized by a sub-frame removably mounted in said housing for supporting said lens, reflector and actuator.

3. A photocopier according to claim 2 wherein said sub-frame comprises a wall extending across said path with an opening in the path and the reflector covers the opening when the reflector is in operative position.

References Cited
UNITED STATES PATENTS

| | | | |
|---|---|---|---|
| 3,181,416 | 5/1965 | Halberg | 88—24 |
| 3,240,115 | 3/1966 | Robbins et al. | 88—24 |

NORTON ANSHER, *Primary Examiner.*

RICHARD A. WINTERCORN, *Assistant Examiner.*

U.S. Cl. X.R.

350—202; 355—3, 13